US011500518B2

(12) United States Patent
Phan et al.

(10) Patent No.: US 11,500,518 B2
(45) Date of Patent: Nov. 15, 2022

(54) CONTACT CARDS WITH DYNAMIC INTERACTION INFORMATION

(71) Applicant: Dropbox, Inc., San Francisco, CA (US)

(72) Inventors: Daniel Phan, Seattle, WA (US); Flora Ellis, Seattle, WA (US); Henry Liu, Berkeley, CA (US); Constance Wellman, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 17/343,331

(22) Filed: Jun. 9, 2021

(65) Prior Publication Data

US 2021/0294467 A1   Sep. 23, 2021

Related U.S. Application Data

(63) Continuation of application No. 16/543,142, filed on Aug. 16, 2019, now Pat. No. 11,048,383.

(51) Int. Cl.
| | |
|---|---|
| *G06F 3/0482* | (2013.01) |
| *G06F 9/451* | (2018.01) |
| *G06F 16/9535* | (2019.01) |
| *H04L 67/306* | (2022.01) |
| *H04L 51/42* | (2022.01) |
| *H04L 67/53* | (2022.01) |

(52) U.S. Cl.
CPC ............ *G06F 3/0482* (2013.01); *G06F 9/451* (2018.02); *G06F 16/9535* (2019.01); *H04L 51/42* (2022.05); *H04L 67/306* (2013.01); *H04L 67/53* (2022.05)

(58) Field of Classification Search
CPC .... G06F 3/0482; G06F 9/451; G06F 16/9535; H04L 51/22; H04L 67/20; H04L 67/306
See application file for complete search history.

(56) References Cited

U.S. PATENT DOCUMENTS

| | | |
|---|---|---|
| 8,156,098 B1 | 4/2012 | Landsman et al. |
| 8,346,864 B1 | 1/2013 | Amidon et al. |
| 8,812,961 B2 | 8/2014 | Srinivasaraghavan et al. |

(Continued)

FOREIGN PATENT DOCUMENTS

| | | | |
|---|---|---|---|
| GB | 2379522 A | 3/2003 | |
| WO | WO-2007127812 A2 * | 11/2007 | ............. H04L 67/22 |
| WO | 2015157340 A1 | 10/2015 | |

OTHER PUBLICATIONS

Salvatore Catanese et al, "Extraction and Analysis of Facebook Friendship Relations", published in Computational Social Networks: Mining and Visualization, pp. 291-324, Jun. 2012, retrieved from https://arxiv.org/abs/1105.6307 on Mar. 29, 2022. (Year: 2012).*

(Continued)

*Primary Examiner* — Shourjo Dasgupta
(74) *Attorney, Agent, or Firm* — Polsinelli PC

(57) ABSTRACT

The present technology can provide a contact card specific to a particular user on one service, showing a plurality of the other interaction points with that user in other, third-party services. A viewing user can interact with the contact card to cause an interaction with the particular user at the third-party service. In some embodiments, the present technology can provide a contact card listing points of contact for multiple team members at one or more third-party services.

20 Claims, 6 Drawing Sheets

(56) References Cited

U.S. PATENT DOCUMENTS

| | | | |
|---|---|---|---|
| 8,856,237 B2 | 10/2014 | Spataro et al. | |
| 8,914,735 B2 | 12/2014 | Sitrick et al. | |
| 9,552,334 B1* | 1/2017 | Meisels | G06F 40/295 |
| 9,667,584 B2* | 5/2017 | Archibong | H04N 21/4147 |
| 9,699,305 B1* | 7/2017 | Compert | H04M 3/436 |
| 9,799,004 B2 | 10/2017 | Buford et al. | |
| 9,818,161 B2* | 11/2017 | Voas | G06Q 50/01 |
| 10,063,559 B2* | 8/2018 | Evans | G06F 16/9566 |
| 10,169,457 B2 | 1/2019 | Miller et al. | |
| 10,243,899 B2 | 3/2019 | Homsany | |
| 10,275,535 B1* | 4/2019 | Trauth | G06F 16/24556 |
| 10,333,884 B2 | 6/2019 | Bradley et al. | |
| 10,671,693 B1* | 6/2020 | Raley | H04L 63/083 |
| 11,210,363 B1* | 12/2021 | Gao | G06F 16/958 |
| 2002/0147625 A1 | 10/2002 | Kolke, Jr. | |
| 2007/0122911 A1 | 5/2007 | Browning et al. | |
| 2007/0266097 A1* | 11/2007 | Harik | H04L 51/32 |
| | | | 709/204 |
| 2008/0052373 A1 | 2/2008 | Pousti | |
| 2008/0155669 A1* | 6/2008 | Harik | H04L 63/0815 |
| | | | 726/6 |
| 2008/0172464 A1 | 7/2008 | Thattai et al. | |
| 2010/0063969 A1 | 3/2010 | Kasargod et al. | |
| 2010/0064012 A1 | 3/2010 | Cruse, Jr. | |
| 2011/0055177 A1 | 3/2011 | Chakra et al. | |
| 2011/0235790 A1 | 9/2011 | Strope et al. | |
| 2012/0166453 A1* | 6/2012 | Broder | G06F 16/9535 |
| | | | 707/E17.104 |
| 2013/0085836 A1* | 4/2013 | Harik | G06Q 20/065 |
| | | | 705/14.39 |
| 2013/0152157 A1 | 6/2013 | Coletrane et al. | |
| 2013/0204664 A1* | 8/2013 | Romagnolo | G06Q 30/0203 |
| | | | 705/7.32 |
| 2014/0012905 A1* | 1/2014 | Roche | H04L 65/00 |
| | | | 709/204 |
| 2014/0081988 A1* | 3/2014 | Woods | G06Q 10/101 |
| | | | 707/748 |
| 2014/0095620 A1* | 4/2014 | Ranjan | G06F 16/245 |
| | | | 709/204 |
| 2014/0195931 A1 | 7/2014 | Kwon et al. | |
| 2014/0229857 A1* | 8/2014 | Haugen | H04L 67/20 |
| | | | 715/753 |
| 2015/0120577 A1 | 4/2015 | Lobo et al. | |
| 2015/0149930 A1* | 5/2015 | Walkin | G06F 3/04883 |
| | | | 715/753 |
| 2015/0186538 A1 | 7/2015 | Yan et al. | |
| 2015/0188870 A1* | 7/2015 | Sharp | H04L 51/22 |
| | | | 715/752 |
| 2016/0150063 A1 | 5/2016 | Choi et al. | |
| 2016/0373165 A1 | 12/2016 | Augusto Di Grandi Nery et al. | |
| 2017/0318077 A1* | 11/2017 | Borse | G06F 16/2455 |
| 2017/0359284 A1 | 12/2017 | Sudduth et al. | |
| 2018/0025084 A1 | 1/2018 | Conlan et al. | |
| 2018/0124159 A1* | 5/2018 | Sun | H04L 43/16 |
| 2018/0198884 A1 | 7/2018 | Debald et al. | |
| 2018/0322440 A1 | 11/2018 | Ren et al. | |
| 2019/0199674 A1 | 6/2019 | Jain et al. | |
| 2019/0347689 A1 | 11/2019 | Bullock et al. | |
| 2020/0304855 A1* | 9/2020 | Gupta | H04N 21/26283 |
| 2021/0165829 A1* | 6/2021 | Dornbush | G06Q 10/101 |

OTHER PUBLICATIONS

Luka Humski et al, "Exploratory Analysis of Pairwise Interactions in Online Social Networks", published in Automatika, 58:4, pp. 422-428, 2017, retrieved from https://doi.org/10.1080/00051144.2018.1468162 on Mar. 29, 2022. (Year: 2017).*

Salvatore A. Catanese et al, "Crawling Facebook for Social Network Analysis Purposes", published for WIMS' 11, May 25-27, 2011, Songndal, Norway, retrieved on Mar. 29, 2022. (Year: 2011).*

Rinta Kridalukmana, "Generic Social Network Data Crawler Using Attributed Graph", published for Proceedings of 2015 2nd Int. Conference on Information Technology, Computer and Electrical Engineering (ICITACEE), Indonesia, Oct. 16-18, 2015, retrieved on Mar. 29, 2022. (Year: 2015).*

Adedoyin et al., "Development of a Web-based University Collaborative Tool for Effective Distributed Learning," Sep. 2018, vol. 11, No. 3, pp. 33-43.

Final Office Action from U.S. Appl. No. 16/543,142, dated Nov. 6, 2020, 11 pages.

Musa et al., "Towards Flexible Media Sharing: Control And Coordination Issues In NetworkCollaborative Virtual Environment," Dec. 2012, IEEE Colloquium on Humanities, Science andEngineering (CHUSER), Kota Kinabalu, pp. 154-158.

Non-Final Office Action from U.S. Appl. No. 16/543,142, dated Jun. 18, 2020, 17 pages.

Notice of Allowance from U.S. Appl. No. 16/543,142, dated Apr. 14, 2021, 14 pages.

* cited by examiner

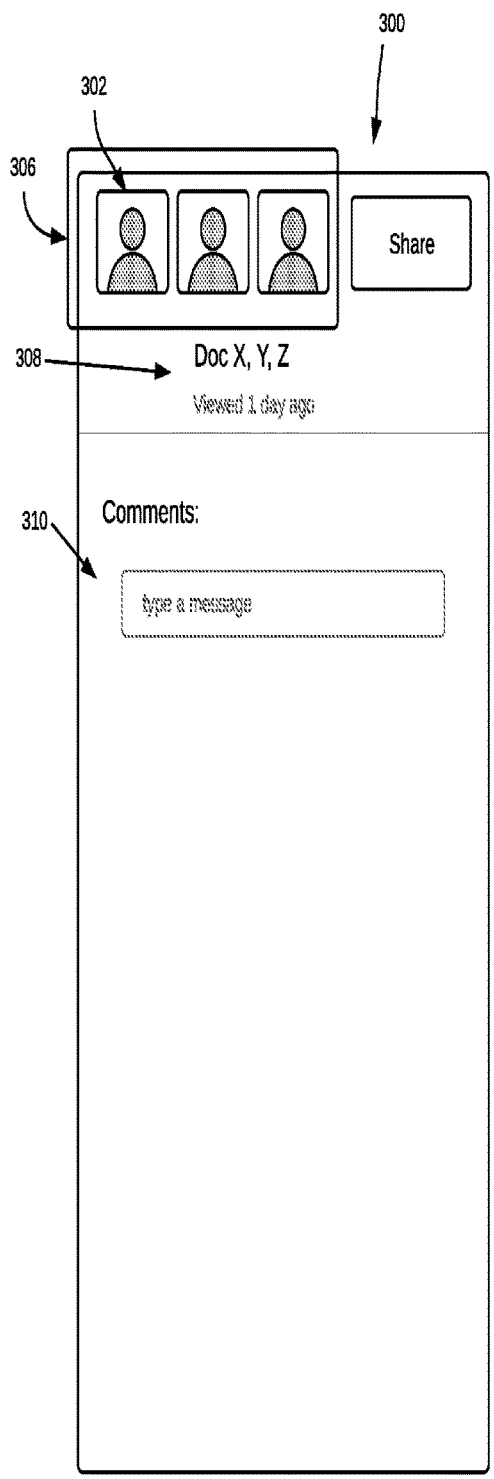
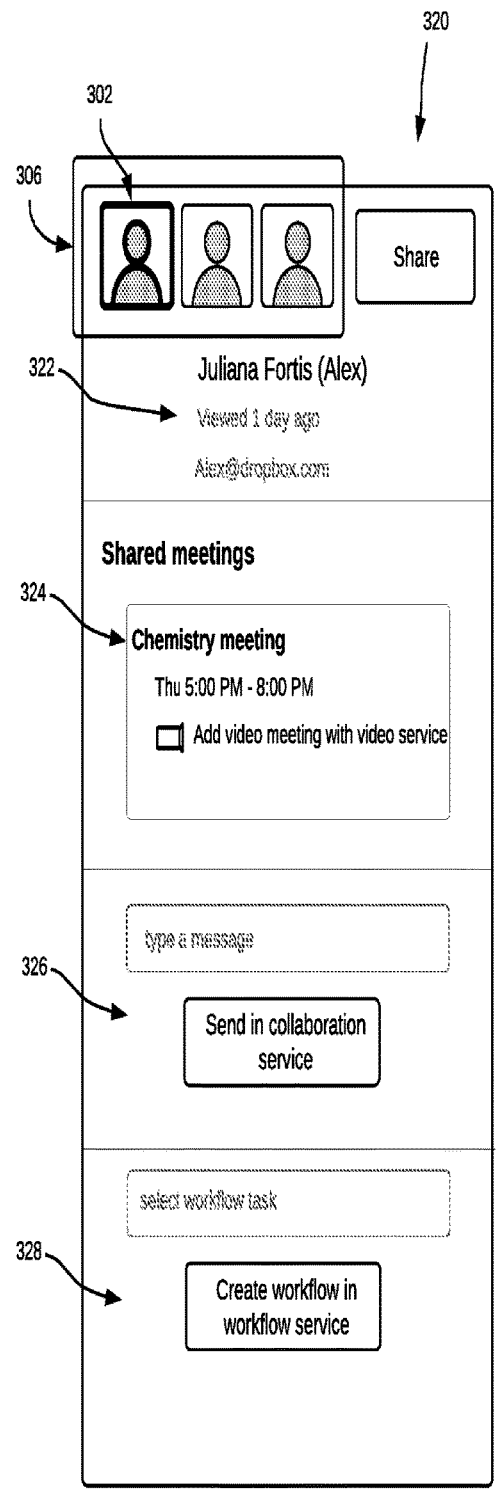
FIG. 4A
FIG. 4B

CONTACT CARDS WITH DYNAMIC INTERACTION INFORMATION

CROSS-REFERENCE TO RELATED APPLICATIONS

This application claims the benefit of priority of U.S. application Ser. No. 16/543,142, filed on Aug. 16, 2019, entitled, CONTACT CARDS WITH DYNAMIC INTERACTION INFORMATION, which is hereby expressly incorporated herein by reference in its entirety.

TECHNICAL FIELD

The present technology pertains to software contact cards, and more particularly to contact cards that provide an interactive interface to permit interaction with a user represented on the contact card at a third-party service through the interface provided by the contact card.

BACKGROUND

Team members interact through a plurality of different services as each service may perform one aspect of collaboration better than other services. For example, team members will use email to create a team, or to communicate with those outside of a team, and sometimes for intra-team communication as well. Team members may also utilize a topic-based collaboration service (e.g., SLACK, WEBEX TEAMS, etc.) where team members can conduct an electronic chat regarding a topic. Team members may also utilize a video conference service to conduct video meetings and to share documents or screens. Team members may also utilize a document management service, (e.g. DROPBOX, etc.) to save content items in a location that is accessible to all team members. Team members may also utilize web hosted documents for simultaneous interaction with a document (e.g. GOOGLE DOCS, PAPER, etc.).

Interacting through all of these different services provides advantages of utilizing the best service available for the specific type of interactions but has the disadvantage of having to separately log into all of these services in order to interact with team members.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIGS. 4A, 4B, 4C, and 4D show example user interfaces in accordance with some aspects of the present technology.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The disclosed technology addresses the need in the art for an interface that can surface a plurality of third-party services in which to interact with a user. Team members interact through a plurality of different services as each service may perform one aspect of collaboration better than other services. Interacting through all these different services provides advantages of utilizing the best service available for the specific type of interactions but has the disadvantage of having to separately log into all these services in order to interact with team members.

The present technology can provide a contact card specific to a particular user on one service, showing a plurality of the other interaction points with that user in other, third-party services. In some embodiments, a viewing user can interact with the contact card to cause an interaction with the particular user at the third-party service.

In some embodiments, the present technology can provide a contact card listing points of contact for multiple team members at one or more third-party services.

The present technology can address current problems in the art by making it easier to collaborate with team members on the appropriate service for the desired type of interaction without the inconvenience of first navigating to the appropriate service, logging in, and then finding the right user. In this way, the present technology requires less burden on both a computing system (by needing to navigate to and render fewer interfaces) and a viewing user (by reducing the number of steps they need to perform).

Figure 1:
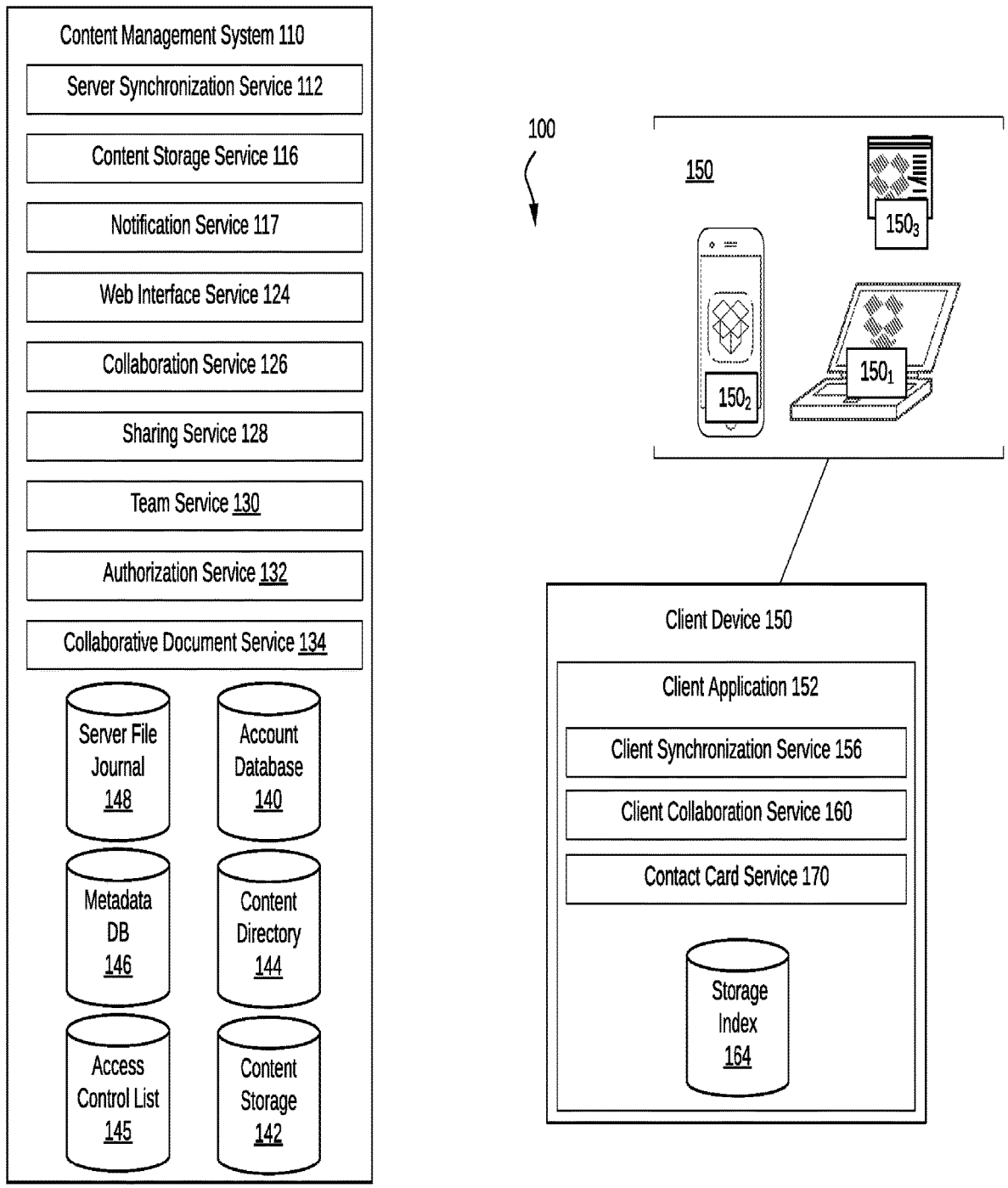
FIG. 1 shows an example embodiment of a content management system and client devices.

In some embodiments, the disclosed technology is deployed in the context of a content management system having content item synchronization capabilities and collaboration features, among others. An example system configuration 100 is shown in FIG. 1, which depicts content management system 110 interacting with client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, team, company, etc.) can create an account with content management system, and account details can be stored in account database 140. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

Content Item Storage

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 is combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1.

In some embodiments, content storage 142 is associated with at least one content storage service 116, which includes software or other processor executable instructions for managing the storage of content items including, but not limited to, receiving content items for storage, preparing content items for storage, selecting a storage location for the content item, retrieving content items from storage, etc. In some embodiments, content storage service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content storage service 116 can output a unique ID for each content item.

Content storage service 116 can also designate or record a content path for a content item in metadata database 146. The content path can include the name of the content item and/or folder hierarchy associated with the content item. For example, the content path can include a folder or path of folders in which the content item is stored in a local file system on a client device. While content items are stored in content storage 142 in blocks and may not be stored under a tree like directory structure, such directory structure is a comfortable navigation structure for users. Content storage service 116 can define or record a content path for a content item wherein the "root" node of a directory structure can be a namespace for each account. Within the namespace can be a directory structure defined by a user of an account and/or content storage service 116. Metadata database 146 can store the content path for each content item as part of a content entry.

In some embodiments, the namespace can include additional namespaces nested in the directory structure as if they are stored within the root node. This can occur when an account has access to a shared collection. Shared collections can be assigned their own namespace within content management system 110. While some shared collections are actually a root node for the shared collection, they are located subordinate to the account namespace in the directory structure, and can appear as a folder within a folder for the account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item and/or a namespace to which the content entry belongs.

Content storage service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content storage service 116 can also store metadata describing content items, content item types, folders, file path, and/or the relationship of content items to various accounts, collections, or groups in metadata database 146, in association with the unique ID of the content item.

Content storage service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content storage service can provide the ability to undo operations, by using a content item version control that tracks changes to content items, different versions of content items (including diverging version trees), and a change history that can be acquired from the server file journal 148.

Content Item Synchronization

Another feature of content management system 110 is synchronization of content items with at least one client device 150. Client device(s) can take different forms and have different capabilities. For example, client device 150₁ is a computing device having a local file system accessible by multiple applications resident thereon. Client device 150₂ is a computing device wherein content items are only accessible to a specific application or by permission given by the specific application, and the content items are typically stored either in an application specific space or in the cloud. Client device 150₃ is any client device accessing content management system 110 via a web browser and accessing content items via a web interface. While example client devices 150₁, 150₂, and 150₃ are depicted in form factors such as a laptop, mobile device, or web browser, it should be understood that the descriptions thereof are not limited to devices of these example form factors. For example a mobile device such as client 150₂ might have a local file system accessible by multiple applications resident thereon, or client 150₂ might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments, client devices can access content using shared links and do not require an account.

As noted above, some client devices can access content management system 110 using a web browser. However, client devices can also access content management system 110 using client application 152 stored and running on client device 150. Client application 152 can include a client synchronization service 156.

Client synchronization service 156 can be in communication with server synchronization service 112 to synchronize changes to content items between client device 150 and content management system 110.

Client device 150 can synchronize content with content management system 110 via client synchronization service 156. The synchronization can be platform agnostic. That is, content can be synchronized across multiple client devices of varying type, capabilities, operating systems, etc. Client synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while client synchronization service 156 can monitor directory on client device 150 for changes to files within the monitored folders.

When client synchronization service 156 detects a write, move, copy, or delete of content in a directory that it monitors, client synchronization service 156 can synchronize the changes to content management storage service 116. In some embodiments, client synchronization service 156 can perform some functions of content management storage service 116 including functions addressed above such as dividing the content item into blocks, hashing the content item to generate a unique identifier, etc. Client synchronization service 156 can index content within client storage index 164 and save the result in storage index 164. Indexing can include storing paths plus a unique server identifier, and a unique client identifier for each content item. In some embodiments, client synchronization service 156 learns the unique server identifier from server synchronization service 112, and learns the unique client identifier from the operating system of client device 150.

Client synchronization service 156 can use storage index 164 to facilitate the synchronization of at least a portion of the content within client storage with content associated with a user account on content management system 110. For example, client synchronization service 156 can compare storage index 164 with content management system 110 and detect differences between content on client storage and content associated with a user account on content management system 110. Client synchronization service 156 can then attempt to reconcile differences by uploading, downloading, modifying, and deleting content on client storage as appropriate. Content storage service 116 can store the changed or new block for the content item and update server file journal 148, metadata database 146, content directory 144, content storage 142, account database 140, etc. as appropriate.

When synchronizing from content management system 110 to client device 150, a mount, modification, addition, deletion, move of a content item recorded in server file journal 148 can trigger a notification to be sent to client device 150 using notification service 117. When client device 150 is informed of the change a request changes listed in server file journal 148 since the last synchronization point known to the client device. When client device 150 determines that it is out of synchronization with content management system 110, client synchronization service 156 requests content item blocks including the changes, and updates its local copy of the changed content items.

In some embodiments, storage index 164 stores tree data structures wherein one tree reflects the latest representation of a directory according to server synchronization service 112, while another tree reflects the latest representation of the directory according to client synchronization service 156. Client synchronization service can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for content item changes and queue those changes for later synchronization to content management system 110 when a network connection is available. Similarly, a user can manually start, stop, pause, or resume synchronization with content management system 110.

Client synchronization service 156 can synchronize all content associated with a particular user account on content management system 110. Alternatively, client synchronization service 156 can selectively synchronize a portion of the content of the total content associated with the particular user account on content management system 110. Selectively synchronizing only a portion of the content can preserve space on client device 150 and save bandwidth.

In some embodiments, client synchronization service 156 selectively stores a portion of the content associated with the particular user account and stores placeholder content items in client storage for the remainder portion of the content. For example, client synchronization service 156 can store a placeholder content item that has the same filename, path, extension, metadata, of its respective complete content item on content management system 110, but lacking the data of the complete content item. The placeholder content item can be a few bytes or less in size while the respective complete content item might be significantly larger. After client device 150 attempts to access the content item, client synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments, a link can be associated with access restrictions enforced by content management system 110 and access control list 145. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier or multiple user account identifiers to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145. For example, in some embodiments, user account identifiers associated with a single content entry can specify different permissions for respective user account identifiers with respect to the associated content item.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Team Service

In some embodiments, content management system 110 includes team service 130. Team service 130 can provide functionality for creating and managing defined teams of user accounts. Teams can be created for a company, with sub-teams (e.g., business units, or project teams, etc.), and user accounts assigned to teams and sub-teams, or teams can be created for any defined group of user accounts. Teams service 130 can provide a common shared space for the team, private user account folders, and access limited shared folders. Teams service can also provide a management interface for an administrator to manage collections and content items within team, and can manage user accounts that are associated with the team.

Authorization Service

In some embodiments, content management system 110 includes authorization service 132. Authorization service 132 ensures that a user account attempting to access a namespace has appropriate rights to access the namespace. Authorization service 132 can receive a token from client application 152 that follows a request to access a namespace and can return the capabilities permitted to the user account. For user accounts with multiple levels of access (e.g. a user account with user rights and administrator rights) authorization service 132 can also require explicit privilege escalation to avoid unintentional actions by administrators.

Presence and Seen State

In some embodiments, content management system can provide information about how users with which a content item is shared are interacting or have interacted with the content item. In some embodiments, content management system 110 can report that a user with which a content item is shared is currently viewing the content item. For example, client collaboration service 160 can notify notifications service 117 when client device 150 is accessing the content item. Notifications service 117 can then notify all client devices of other users having access to the same content item of the presence of the user of client device 150 with respect to the content item.

In some embodiments, content management system 110 can report a history of user interaction with a shared content item. Collaboration service 126 can query data sources such as metadata database 146 and server file journal 148 to determine that a user has saved the content item, that a user has yet to view the content item, etc., and disseminate this status information using notification service 117 to other users so that they can know who currently is or has viewed or modified the content item.

Collaboration service 126 can facilitate comments associated with content, even if a content item does not natively support commenting functionality. Such comments can be stored in metadata database 146.

Collaboration service 126 can originate and transmit notifications for users. For example, a user can mention another user in a comment and collaboration service 126 can send a notification to that user that he has been mentioned in the comment. Various other content item events can trigger notifications, including deleting a content item, sharing a content item, etc.

Collaboration service 126 can provide a messaging platform whereby users can send and receive instant messages, voice calls, emails, etc.

Collaboration Content Items

In some embodiments, content management service can also include Collaborative document service 134 which can provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments, this can be managed by requiring two users access a content item through a web interface and there they can work on the same copy of the content item at the same time.

Collaboration Companion Interface

In some embodiments, client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 142 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internetof-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via a file system explorer integrated with the file system or via a webpage displayed using a web browser application.

Client application 152 can also include a contact card service 170. Contact card service 170 is configured to present a contact card interface that can provide information about one or more contact's ability to be interacted with at one or more third-party services.

Contact card service 170 can contact a third-party service through an API and provide a user's credentials to learn information about contacts available to be interacted with at the service. In some embodiments, contact card service 170 can have a counterpart service at content management system 110, wherein the counterpart service communicates with the one or more third-party services and provides the relevant information to the contact card service for display.

In some embodiments, contact card service 170 can also be part of the web interface service 124 whereby when client device 150 accesses content management system 110 via the web interface, the contact card service can be made available through the web interface as well as through client application 152.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as a folder in a file system, and all content items within that folder can be synchronized with content management system 110. In some embodiments, client application 152 can include a selector to choose one of the multiple accounts to be the primary account or default account.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

Figure 2:
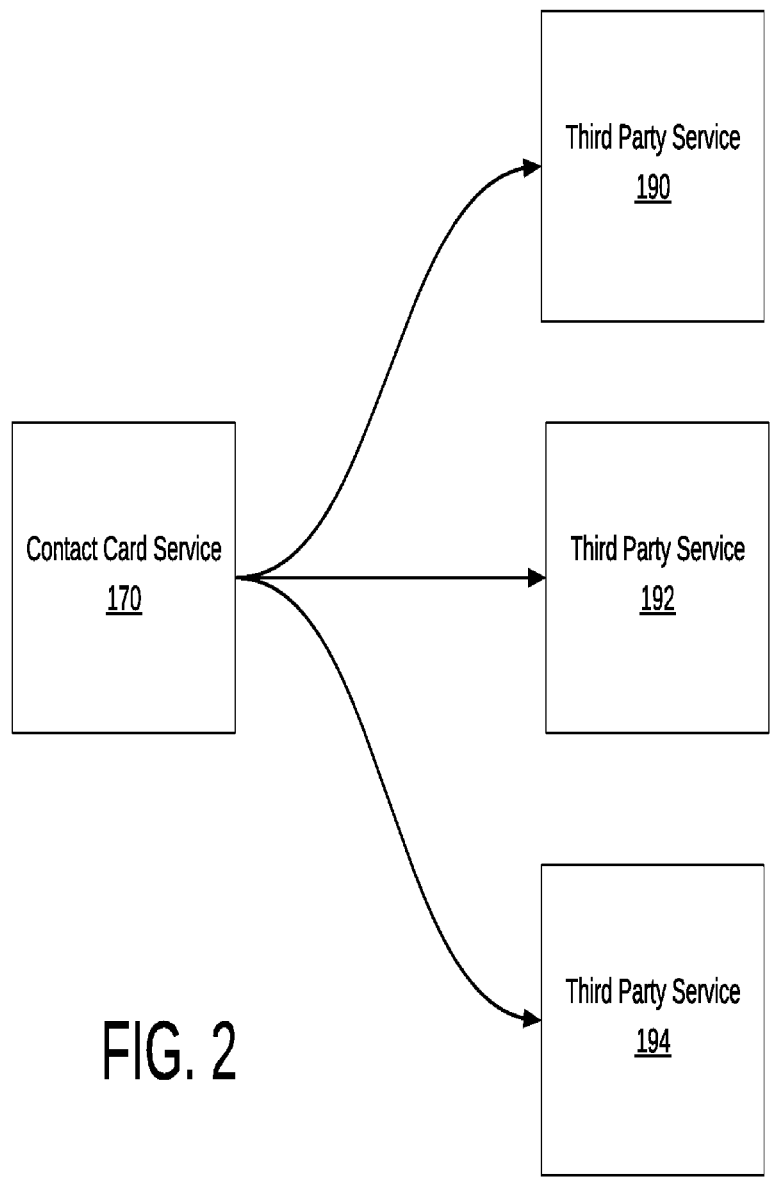
FIG. 2 shows an example system embodiment in accordance with some aspects of the present technology.

FIG. 2 illustrates an example system embodiment wherein contact card service 170 is in communication with a plurality of third-party services for example third-party service 190, third-party service 192, and third-party service 194. While FIG. 2 illustrates three third-party services, it should be understood that this is for example only. Contact card service 170 can be in communication with any number of third-party services.

As used herein, a third-party service is a service that is separate from a service in which the contact card of the present technology is presented. The third-party services are separate in that each user will have a separate user account with the service in which the contact card of the present technology is presented and a separate user account with each third-party service. To the extent that any service disclosed herein interacts with a third-party service, the interaction can be by way of an application programming interface (API).

Figure 3:
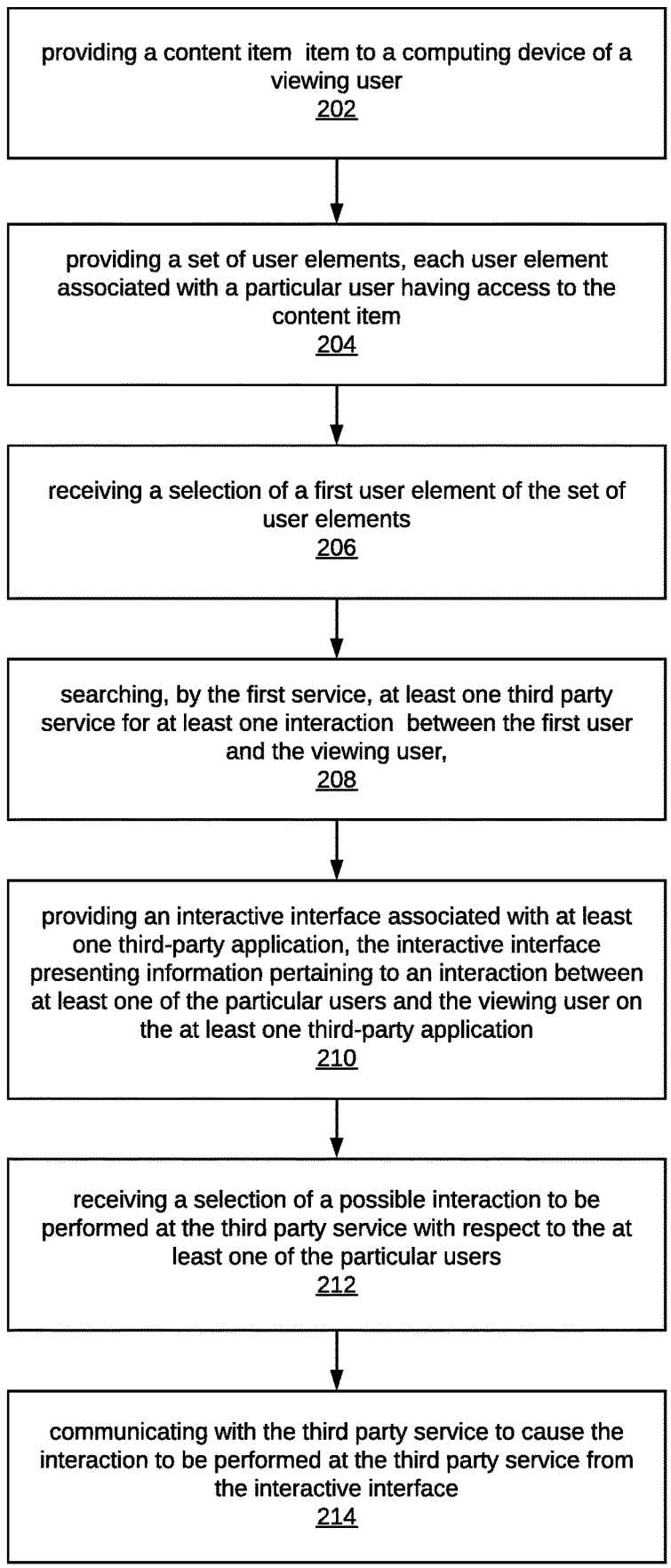
FIG. 3 shows an example method embodiment in accordance with some aspects of the present technology.

FIG. 3 illustrates an example method for providing an interactive contact card interface and for receiving a selection of an interaction to be performed by a third-party service. FIGS. 4A, 4B, 4C, and 4D illustrates examples of interactive content card user interfaces. FIG. 3 will be discussed herein with reference to FIG. 4 to provide a clearer explanation. However, the method illustrated in FIG. 3 should not be limited by aspects depicted in the user interfaces illustrated in FIGS. 4A, 4B, 4C, and 4D, and likewise aspects of FIGS. 4A, 4B, 4C, and 4D should not be limited by the method illustrated in FIG. 3.

FIG. 3 begins when client application 152 presents (202) a content item in a user interface to a viewing user on client device 150. The content item may be locally stored on client device 150 or may be retrieved from content storage 142 on content management system 110. The content item can be presented (202) in a list of content items, such as in a file browsing application user interface.

The viewing user can have an account with content management system 110 and can be logged into that account on client application 152.

The viewing user can select the content item in the user interface which can result in the presentation of user interface 300 illustrated in FIG. 4A. User interface 300 is a contextual pane 300 that can be presented in a sidebar of a file browsing application, or can be presented by a companion application. In some embodiments, client application 152 can be the file browsing application that includes capabilities to provide contextual pane 300. Contextual pane 300 provides context with respect to a selected content item. For example, contextual pane 300 shows face pile 306, which is a set of user elements where each element is associated with a particular user having access to the content item.

While FIG. 4A, FIG. 4B, FIG. 4C, and FIG. 4D show face pile 306 in contextual pane 300, it should be appreciated that face pile 306, or any other listing of users having access to the content item can be presented in other parts of the graphical user interface other than face pile 306. For example, on a web page, face pile 306 may be displayed in a header. In some embodiments, contextual pane 300 might only appear after a face in face pile 306 has been selected. In some embodiments, information displayed in contextual pane 300 can be alternatively displayed in other parts of the user interface, or can be redundantly displayed in other parts of the user interface.

Additionally, contextual pane 300 can include an area 308 for displaying presence, access, and seen state information. Presence information refers to whether one of the particular users represented in face pile 306 is currently accessing the content item. Access information refers to the type of access a user has to the content item. Seen state information refers to when the content item was last viewed. For example, in FIG. 4A, the content item was last viewed one day ago.

Contextual pane 300 can also show comments and notes associated with the content item in comment portion 310.

The viewing user can select (206) a first user element 302 representing one particular user. Contextual pane 300 can receive (206) the selection of the first user element 302. In response to the selection of the first user element 302 contact card service 170 can search (208) at least one third-party service for at least one interaction between the first user and the viewing user.

Contact card service 170 searches (208) third-party service by communicating with the third-party service using an API provided by the third-party service. Contact card service 170 can have previously been given permission from the viewing user to access an account of the viewing user at the third-party service. In some embodiments, the viewing user has provided account credentials for the viewing user's account at the third-party service. Utilizing the viewing user's account credentials at the third-party service, contact card service 170 can search through data associated with the viewing user's account to determine any interactions between the viewing user and the selected first user. In some embodiments, the third-party service may provide specific APIs or search tools for this purpose.

The interactions can include past interactions, such as messages exchanged in a collaboration service, future interactions, such as scheduled meetings, or the ability to have a possible interaction, such as an interface to chat with the selected first user. In some embodiments, the interactions can be filtered or selected such that only interactions pertaining to or that could pertain to a content item, or interactions that also include other particular users are displayed.

In some embodiments, contact card service 170 can identify interactions between the viewing user and the first user by searching the third-party account for an email address of a first user. In some embodiments, contact card service 170 can identify interactions between the viewing user and the first user by searching the third-party account for a name or a close match (fuzzy match) to the name of the first user. A close match may be good enough since contact card service 170 searches the viewing user's account which can provide added confidence in identifying a match. In some embodiments, contact card service 170 can identify interactions between the viewing user and the first user by searching the third-party account for a content item that the first user and the viewing user have collaborated on.

In some embodiments, contact card service 170 can identify interactions between the viewing user and the first user by searching the third-party for the first user's credentials on the third-party service. In many instances both the viewing user and the first user have user accounts with content management system 110 that are linked to one or more third-party services. As such, contact card service may have access and permission to search third-party service for the first user using the first user's credentials, even when the search is prompted by the first user. However, consistent with the present technology disclosed herein, the viewing user may only see information that they are authorized to view on the third-party service and content management system 110.

Contact card service 170 can repeat this procedure for each third-party service that the viewing user has authorized the contact card service 170 to access.

After contact card service 170 has identified at least one interaction between the first user and the viewing user, the contact card service 170 can provide (210) an interactive interface associated with at least one third-party application to present information pertaining to the at least one interaction between the first user and the viewing user. For example, as illustrated in FIG. 4B, the contact card service 170 has presented (210) an interactive interface 324 presenting information from a meeting service. Contact card service 170 has searched the third-party meeting service and determined that first user is reachable by the viewing user at the meeting service. Contact card service 170 has also presented (210) an interactive interface 326 for communicating with the selected first user in a collaboration service. Contact card service 170 has searched the third-party collaboration service and determined that first user is reachable by the viewing user at the collaboration service. Contact card service 170 has also presented (210) an interactive interface 328 for assigning a workflow task to the selected first user at a third-party workflow service. Contact card service 170 has searched the third-party workflow service and determined that first user is reachable by the viewing user at the workflow service.

In each interactive interface 324, 326, 328 of interactive contact card 320 the viewing user can interact with the interactive interface 324, 326, 328 to perform an interaction at the respective third-party service. When contact card service 170 receives (212) a selection of an interaction to be performed at a respective third-party service with respect to the selected first user, the contact card service 170 can communicate (214) with the third-party service to cause the interaction to be performed.

For example, the viewing user can select the video camera icon in the interactive interface 324 to set up a video meeting between the viewing user and the selected first user or add a video meeting to the planned meeting shown in the interactive interface 324. The viewing user can type a message and press the send button in the interactive interface 326 to send a message to the selected first user in a collaboration service such as a messaging service. The viewing user can also select a workflow task and press the create workflow button in the interactive interface 328 to assign a workflow task to the selected first user. Any one of these selections can cause an action to be performed at the third-party service directly from the contact card interface 320.

In some embodiments, one or more of interactive interfaces 324, 326, and 328 can be created by blending information from two or more services. For example, interactive interface 324 can be the result of data obtained from a calendar service, and a meeting service. Contact card interface 170 can determine that the meeting illustrated in interactive interface 324 is present in the viewing user's calendar and that the first user is also part of the meeting. Contact card interface 170 can further determine that the first user can utilize the meeting service and can offer the option to add a video meeting to the calendar invite.

While interactive interface 324 represents a blending of information from two or more services, it should be appreciated that the information from these services can be represented separately. It should also be appreciated that information from any two or more services could be blended if it were desirable.

Figure 4C:
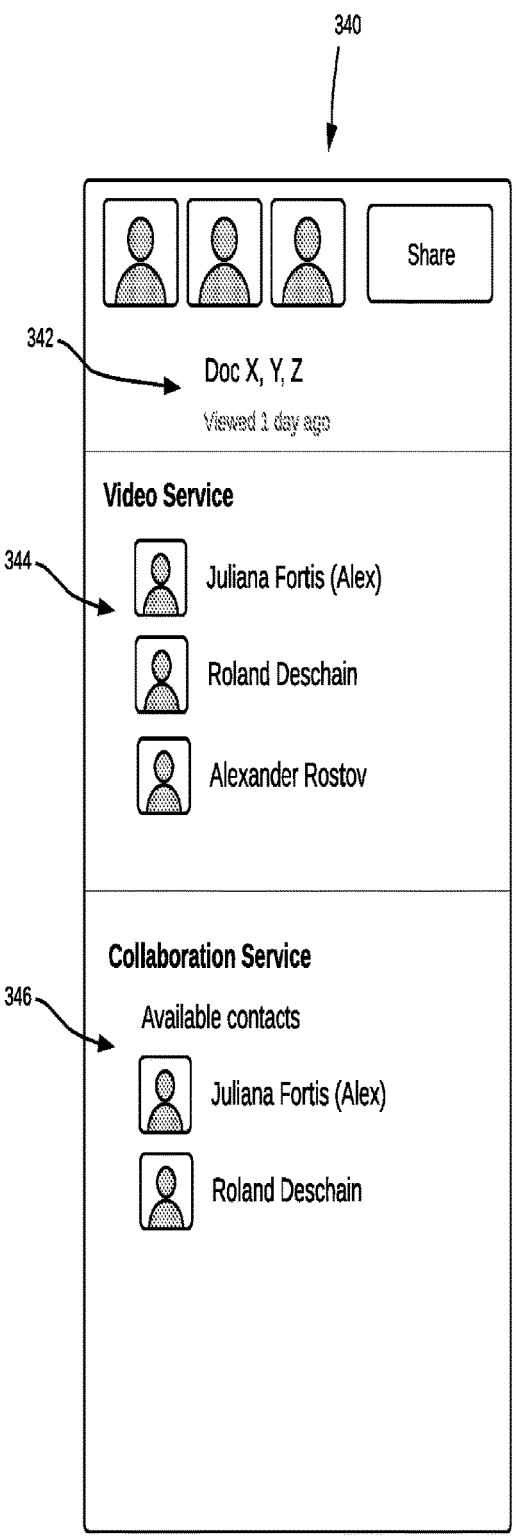
Figure 4D:
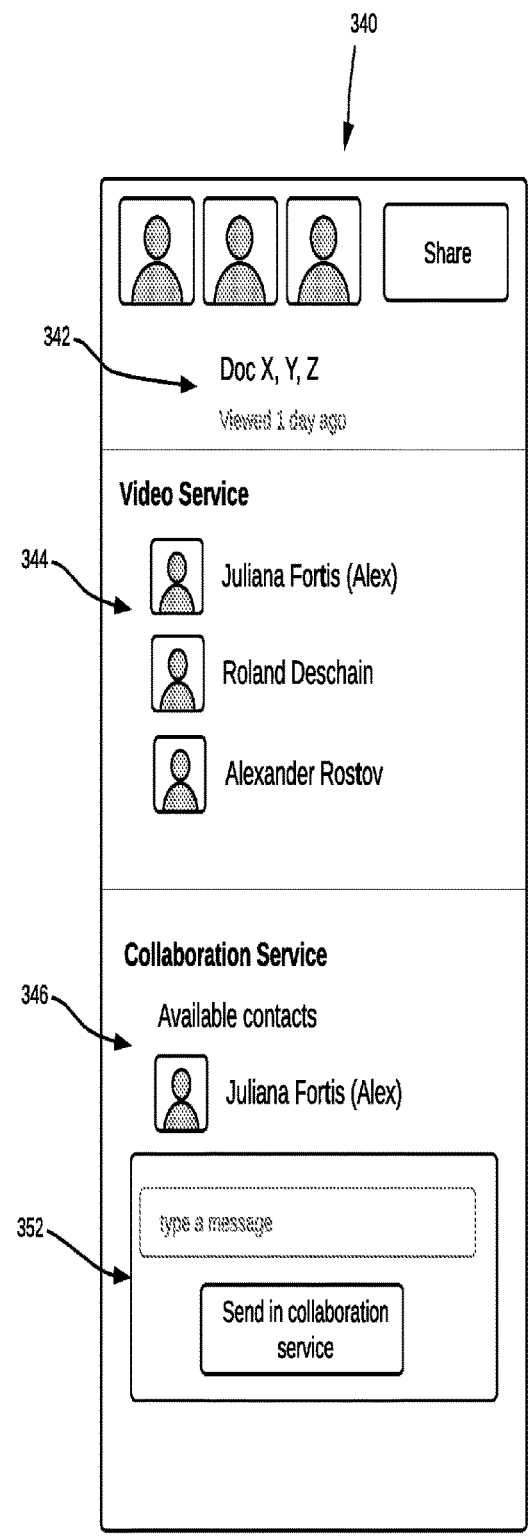

While FIGS. 4A and 4B illustrate an example of integrating interactions between a viewing user and a first selected user on a contact card for the first selected user, the present technology can also provide interactions surrounding a selected content item. FIG. 4C shows another example of a context panel with respect to a content item. FIG. 4D shows context panel 340 showing context pertaining to a selected content item. Just as in FIG. 4A context panel 340 presents seen state information 342. However, context panel 340 can also present interactive interfaces where the content item can be interacted with at one or more third-party service. For example, in interactive interface 344 the viewing user can select one or more of the particular users having access to the content item that are available for access through a third-party video service. The viewing user can select one or more of the particular users to share the content item with using the third-party video service.

Interactive interface 346 allows a viewing user to select one or more of the particular users having a user account at the collaboration service to send a message to the selected user.

FIG. 4C illustrates that all three particular users having access to the content item are available through the video service but only two of the particular users are available through the collaboration service.

In some embodiments, availability at a third-party service refers to whether a particular user has an account at the third-party service. In some embodiments, availability of third-party service refers to whether a particular user is currently logged into the third-party service, wherein a particular user that has an account at the third-party service would not be shown in an interactive interface if they are not logged in, or not currently available at the third party service.

The interactive interfaces 344 and 346 are generated in the same way as they are generated in FIG. 4B. Contact card service 170 can search one or more third-party services using the viewing user's account credentials at the third-party service to identify the presence of a particular user having access to the content.

The interactive interfaces 344 and 346 include selectable elements that are effective to cause actions to be performed at the third-party service. For example in FIG. 4D, the viewing user has selected one of the particular users available at the collaboration service, which has resulted in a further interface 352 to be presented which is effective to receive a message and to send it to the third-party collaboration service.

The interactive contact card of the present technology can be helpful in bridging the plurality of different services that a user may utilize to collaborate with team members. As such, it may be desirable to have a form of the interactive contact card available at many services, but separate configuration of the interactive contact card at each service could be tedious. Rather than requiring a user to enter their contact information to each of the plurality of services multiple times, the present technology can include a tool for a single set up across each of the plurality of different services.

In such an embodiment, when the user provides their account information to the plurality of different services, the current service can interact with each of the plurality of different services through an API to share the user's account information—subject to the viewing user providing their consent.

Another way to provide the interactive contact card interface at the plurality of different services is for the plurality of different services to utilize the contact card service as its own stand-alone service. Each of the plurality of different services could interact with the interactive contact card service to acquire the information to display, or to provide a frame from which to view the interactive contact card within each third party service.

Figure 5:
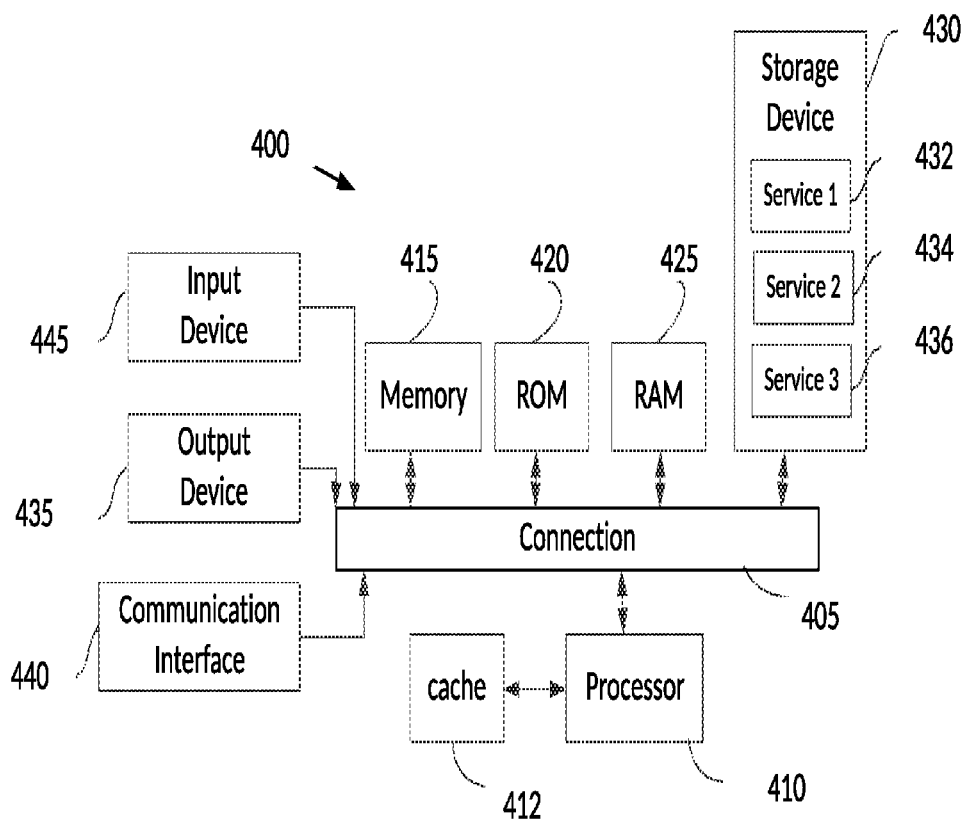
FIG. 5 shows an example of a system for implementing certain aspects of the present technology.

FIG. 5 shows an example of computing system 400, which can be for example any computing device making up client device 150, content management system 110, contact card service 170 or any component thereof in which the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments, computing system 400 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read only memory (ROM) 420 and random access memory (RAM) 425 to processor 410. Computing system 400 can include a cache of high-speed memory 412 connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
   retrieving, by a first service, interaction information from a third-party service, the interaction information associated with users of the third-party service, the users including a viewing user and at least one team member of a plurality of team members;
   searching, by the first service, the interaction information from the third-party service for a subset of the interaction information, wherein the subset of the interaction information identifies a subset of the plurality of team members including the viewing user and the at least one team member that interacted with the viewing user using the third-party service in an interaction regarding a particular content item;
   determining, by the first service and from the subset of the interaction information, that the viewing user can interact with the subset of the plurality of team members in the interaction regarding the particular content item on the third-party service; and
   providing, by the first service, an interactive interface to the viewing user to enable the viewing user to select and to interact with the at least one team member at the third-party service, wherein the interactive interface is determined by the interaction and the particular content item.

2. The method of claim 1, further comprising:
   presenting a user interface including representations of the plurality of team members, wherein the user interface further includes the interactive interface to interact with the at least one team member at the third-party service, and includes a second interactive interface to interact with at least one other team member at a second third-party service, and wherein the interactive interface is different from the second interactive interface.

3. The method of claim 2, wherein determining that the viewing user can interact with the subset of the plurality of team members on the third-party service further comprises:
   identifying an account identifier associated with an account of the at least one team member on the third-party service.

4. The method of claim 2, further comprising:
   providing another user interface to select the particular content item from a plurality of content items; and
   receiving an indication that the viewing user has selected the particular content item, wherein the user interface to interact with the at least one team member using the third-party service is provided after receiving the indication that the viewing user has selected the particular content item.

5. The method of claim 1, comprising:
   presenting a user interface including representations of the plurality of team members, wherein the user interface further includes the interactive interface to interact with the at least one team member at the third-party service;
   receiving a selection of a representation of the at least one team member in the user interface;
   presenting first data retrieved from the third-party service in the interactive interface, the first data corresponding to a first interaction between the viewing user and the at least one team member at the third-party service; and presenting second data retrieved from a second third-party service in the interactive interface, the second data corresponding to a second interaction between the viewing user and the at least one team member at the second third-party service.

6. The method of claim 1, wherein determining that the viewing user can interact with the subset of the plurality of team members on the third-party service further comprises:
searching the interaction information received from the third-party service for an interaction event associated with the particular content item to which both the viewing user and the at least one team member have access at the first service.

7. The method of claim 1, wherein providing the interactive interface to interact with the at least one team member at the third-party service comprises:
determining, by the first service, a type of user input associated with the third-party service; and
providing, by the first service, an input control in the interactive interface based on the type of user input and the interaction associated with the third-party service.

8. The method of claim 1, wherein the retrieving the interaction information from the third-party service comprises:
communicating with the third-party service using an access credential of the viewing user to retrieve the interaction information.

9. The method of claim 8, wherein the retrieving the interaction information from the third-party service includes searching the user account of the viewing user at the third-party service for an email account of the at least one team member.

10. The method of claim 1, wherein the retrieving the interaction information from the third-party service includes searching for at least one interaction associated with a user account of the viewing user at the third-party service for actions performed with respect to the particular content item at the third-party service.

11. A contact service system for determining one or more third-party services where at least one team member can be contacted, the contact service system comprising:
a storage configured to store instructions; and
a processor configured to execute the instructions and cause the processor to:
retrieve, by a first service, interaction information from a third-party service, the interaction information associated with users of the third-party service, the users including a viewing user and at least one team member of a plurality of team members;
search, by the first service, the interaction information from the third-party service for a subset of the interaction information, wherein the subset of the interaction information identifies a subset of the plurality of team members including the viewing user and the at least one team member that interacted with the viewing user using the third-party service in an interaction regarding a particular content item;
determine, by the first service and from the subset of the interaction information, that the viewing user can interact with the subset of the plurality of team members on the third-party service; and
provide, by the first service, an interactive interface to the viewing user to enable the viewing user to select and to interact with the at least one team member at the third-party service.

12. The contact service system of claim 11, wherein the processor is configured to execute the instructions and further cause the processor to:
present a user interface including representations of the plurality of team members, wherein the user interface further includes the interactive interface to interact with the at least one team member at the third-party service, and includes a second interactive interface to interact with at least one other team member at a second third-party service.

13. The contact service system of claim 11, wherein the processor is configured to execute the instructions and further cause the processor to:
present a user interface including representations of the plurality of team members, wherein the user interface further includes the interactive interface to interact with the at least one team member at the third-party service;
receive a selection of a representation of the at least one team member in the user interface;
present data retrieved from the third-party service in the interactive interface, the data corresponding to a first interaction between the viewing user and the at least one team member at the third-party service; and
present data retrieved from a second third-party service in the interactive interface, the data corresponding to a second interaction between the viewing user and the at least one team member at the second third-party service.

14. The contact service system of claim 11, wherein the processor is configured to execute the instructions and further cause the processor to:
search the interaction information received from the third-party service for an interaction event associated with the particular content item to which both the viewing user and the at least one team member have access at the first service.

15. The contact service system of claim 11, wherein the processor is configured to execute the instructions and further cause the processor to:
determine, by the first service, a type of user input associated with the third-party service; and
provide, by the first service, an input control in the interactive interface based on the type of user input associated with the third-party service.

16. The contact service system of claim 11, wherein the processor is configured to execute the instructions and further cause the processor to:
communicate with the third-party service using an access credential of the viewing user to retrieve the interaction information.

17. A non-transitory computer readable medium comprising instructions that, when executed by a computing system, cause the computing system to:
retrieve, by a first service, interaction information from a third-party service the interaction information associated with users of the third-party service, the users including a viewing user and at least one team member of a plurality of team members, the team members all having access to a particular content item;
search, by the first service, the interaction information from the third-party service for a subset of the interaction information, wherein the subset of the interaction information identifies a subset of the plurality of team members including the viewing user and the at least one team member that interacted with the viewing user using the third-party service;

determine, by the first service and from the subset of the interaction information, that the viewing user can interact with the subset of the plurality of team members on the third-party service; and provide, by the first service, an interactive interface to the viewing user to enable the viewing user to select and to interact with the at least one team member at the third-party service.

18. The computer readable medium of claim 17, wherein the computer readable medium further comprises instructions that, when executed by the computing system, cause the computing system to:

present a user interface including representations of the plurality of team members, wherein the user interface further includes the interactive interface to interact with the at least one team member at the third-party service, and includes a second interactive interface to interact with at least one other team member at a second third-party service.

19. The computer readable medium of claim 17, wherein the computer readable medium further comprises instructions that, when executed by the computing system, cause the computing system to:

present a user interface including representations of the plurality of team members, wherein the user interface further includes the interactive interface to interact with the at least one team member at the third-party service;

receive a selection of a representation of the at least one team member in the user interface;

present data retrieved from the third-party service in the interactive interface, the data corresponding to a first interaction between the viewing user and the at least one team member at the third-party service; and present data retrieved from a second third-party service in the interactive interface, the data corresponding to a second interaction between the viewing user and the at least one team member at the second third-party service.

20. The computer readable medium of claim 17, wherein the computer readable medium further comprises instructions that, when executed by the computing system, cause the computing system to:

search the interaction information received from the third-party service for an interaction event associated with the particular content item to which both the viewing user and the at least one team member have access at the first service.

* * * * *